…

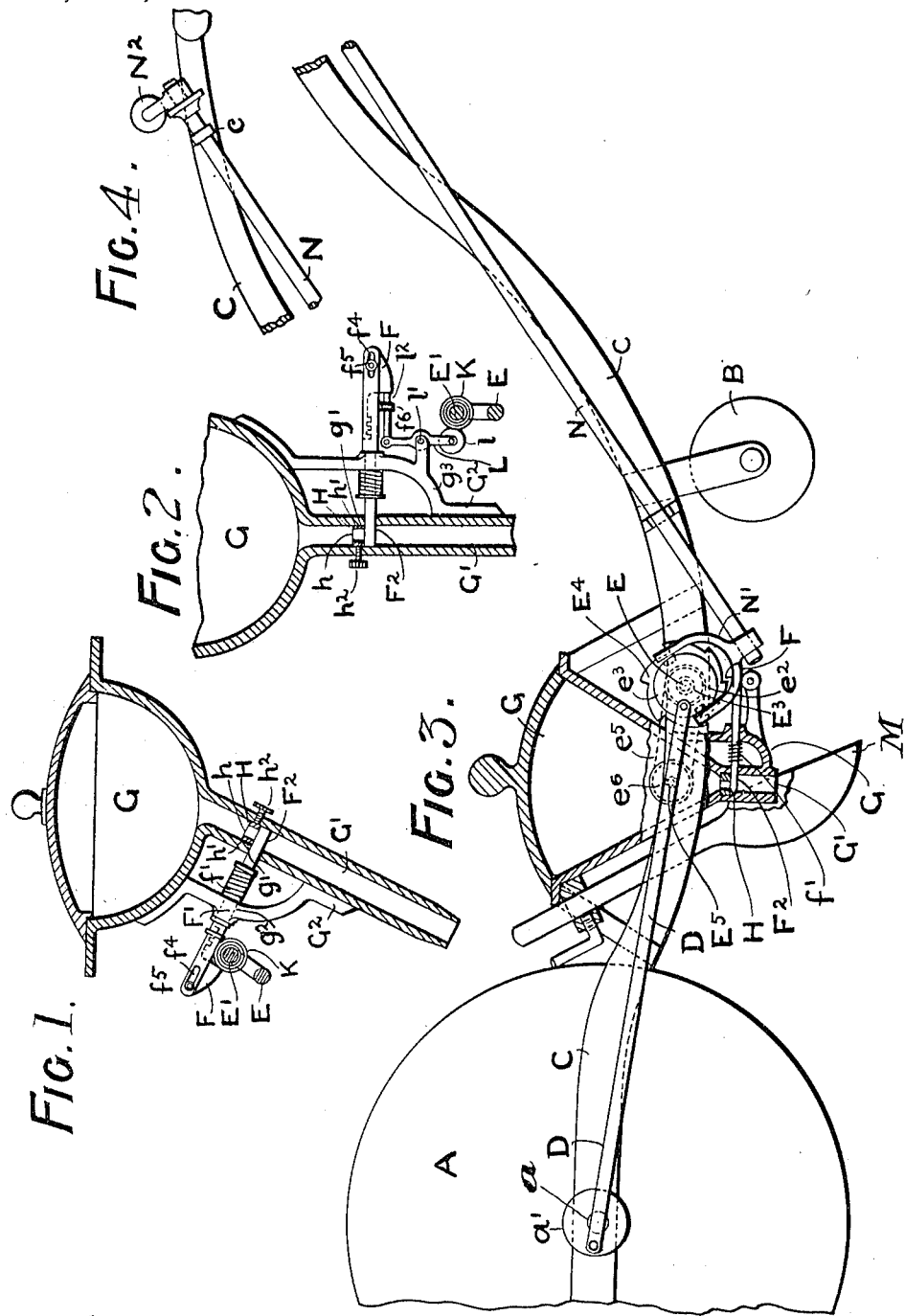

UNITED STATES PATENT OFFICE.

RICHARD JAMES SMITH AND DANIEL MARTIN BAKER, OF DUBLIN, IRELAND.

MACHINE FOR SOWING SEEDS IN DRILLS.

1,072,368.   Specification of Letters Patent.   Patented Sept. 2, 1913.

Application filed March 23, 1910. Serial No. 551,132.

*To all whom it may concern:*

Be it known that we, RICHARD JAMES SMITH, subject of the King of Great Britain, and resident of Dublin, Ireland, (whose post-office address is Glasnevin, Dublin, Ireland,) and DANIEL MARTIN BAKER, subject of the King of Great Britain, and resident of Dublin, Ireland, (whose post-office address is Milbourne avenue, Drumcondra, Dublin, Ireland,) have invented certain Improvements in Machines for Sowing Seeds in Drills, of which the following is a specification.

This invention relates to machines for sowing seeds in drills, of a kind in which the seeds are delivered through a tube that is opened and closed by the reciprocating motion of a valve, actuated by suitable mechanism operatively connected to the bearing wheels.

The invention has for its object to provide improvements in the construction and arrangement of apparatus of this kind, and it will be further described with reference to the accompanying drawings, wherein—

Figure 1 is an enlarged sectional view of a feed box and adjacent parts showing one embodiment of my invention. Fig. 2 is a view similar to Fig. 1 showing a modified form of the invention. Fig. 3 is a side elevation of a machine, with parts in section, of a still further modification of the invention. Fig. 4 is a view in elevation of a continuation of the handle portion of the machine shown in Fig. 3.

The same parts are lettered to correspond in all the figures of the drawings.

Our improved seed sower is supported on a large front roller 9 and on a small plain rear roller B. The front roller A is fixed to a spindle $a$ which is rotatably mounted in bearings in a frame C, and has rigidly secured on each end a crank disk, or its equivalent, $a^1$ connected by a connecting-rod D to a similar crank disk, or equivalent, $e^3$ fast on a shaft E rotatably mounted in the frame C. The connecting-rods D are removably secured to the crank disks $a^1$ and $e^1$ so that they may be detached when it is desired to wheel the apparatus from place to place without delivering seed, or alternatively a clutch may be interposed for disengaging the mechanism. If desired the roller A may be connected to the parallel shaft E on one side only but we prefer to connect it on both sides. It is nevertheless obvious that any other form of driving mechanism, whether chains and cogwheels or otherwise may be utilized.

Referring particularly to Fig. 1, the shaft E is cranked centrally as shown at $E^1$. In the path of revolution of the crank $E^1$ is a blade F, detachably secured to the stem $F^1$ of a spring-closed shutter valve $F^2$, sliding through an aperture in the side of the delivery-tube $G^1$ of the seed box G. Immediately above this is a plate H also sliding through the tube $G^1$, (see Fig. 3). The plate H may be provided with a series of holes $h$ of graduated sizes and with lateral ribs $h^1$ by means of which it can be adjusted as required in grooves $g^1$ in the sides of the delivery tube $G^1$ and fixed by means of a set screw $h^2$.

The valve $F^2$ is provided with a shoulder at $f^2$ (see Fig. 6) against which bears one end of a spring $f^1$ bearing at its other end on a bracket $G^2$ secured to the seed box G. The stem $F^1$ of the valve passes freely through an aperture $g^2$ in the bracket $G^2$ and is slotted longitudinally as shown at $f^4$ to receive the shank $F^3$ of the blade F as shown in Figs. 5 and 6; the stem $F^1$ is also provided with a series of notches or recesses $f$ into one or other of which the tang $f^3$ of the shank $F^3$ is adjusted and the parts secured in the adjusted position by means of the slot $f^4$ in the stem $F^1$ and the wing-nut or equivalent adjusting device $f^5$. The stem $F^1$ and the shank $F^3$ are secured together by the ring J fitted with a set screw (not shown). On the crank $E^1$ of the shaft E is slidably mounted a stepped sleeve K (see Fig. 1) the steps of which correspond in number and position with the recesses $f$ in the stem $F^1$ of the valve.

The action of the machine is as follows:—
The shutter valve $F^2$ is normally kept closed by the spring $f^1$. The cranked axle $E^1$ in revolving strikes the blade F once in each revolution thereby withdrawing the shutter valve $F^2$ from under the apertured plate H allowing the seed to fall therethrough, and thence through the delivery tube into the furrow, the quantity being regulated by the size of the aperture $h$ of that part of the plate H which is in the delivery tube $G^1$. After the cranked axle has passed beyond the blade F the spring $f^1$ closes the shutter valve $F^2$ until the completion of the revolution.

To vary the intervals between successive deliveries of seed, it is only necessary to adjust the stepped sleeve K so that the desired step is in line with the blade F, and to adjust the blade F with the tang $f^3$ of its shank $F^3$ in the corresponding notch or recess $f$; thereby varying the time of travel of the spring-closed shutter valve $F^2$.

The machine is provided with a colter M of the usual character to form the drill to which the seed is led by the delivery tube $G^1$.

In the modification shown in Fig. 2 the crank $E^1$ strikes against a roller $l$ on one end of a lever L pivoted at $l^1$ to an arm $g^3$ on the bracket $G^2$ and pivotally connected at its other end to a rod $l^2$ passing freely through an eye $f^6$ on the blade F. This construction is applicable to a vertically arranged delivery tube which in some cases is desirable.

In the modification shown in Fig. 3 the connecting rods D, D are secured to the crank disks $a^1$ and $e^1$ so that the movement of the roller A is at all times transmitted to the shaft E. In this case, on the rear of one of the crank disks $e^1$ is formed a clutch $e^2$ which gears with a similar clutch $e^3$ slidably mounted on a feather on a tubular shaft $E^3$ and operated by means of a yoke $N^1$ rigidly secured to the end of a rod N supported by lugs $c$ on the frame C and rotated therein by means of a lever handle $N^2$. The tubular shaft $E^3$ is mounted in suitable bearings in the frame C with the shaft E passing therethrough, and is provided with a long spline or feather not shown on which is mounted a series of cog wheels $E^4$ all of the same size and each having a different number of teeth, so that when brought into position to operate the valve $F^2$ each will give a different interval between successive deliveries of seed. A second shaft $E^5$ is rotatably mounted in the frame C and passes through the seed box; the said shaft $E^5$ is rotated by a belt $e^5$ and pulleys $e^7$ or by equivalent means, from the tubular shaft $E^3$. The shaft $E^5$ carries within the seed box an agitator wheel, or a series of blades $e^6$, or equivalent devices, to agitate the seed and prevent it from becoming clogged in the box G.

The action of the machine is as follows:— When the tubular shaft $E^3$ is clutched to the clutch $e^2$ on the disk $e^1$ it will revolve with the shaft E and the teeth of that cog wheel $E^4$ which is in operative position will strike the projection F on the spring shutter valve $F^2$ thereby withdrawing the valve, from under the apertured plate H, as many times in one revolution of the shaft $E^3$ as there are teeth on the wheel in operation. To vary the intervals between successive deliveries of seed, it is only necessary to slide the cog wheels $E^4$ on the tubular shaft $E^3$ until the desired wheel is in position to operate on the projection F of the shutter valve.

We claim:

A seed drill comprising in combination, a frame, wheel and axle, a delivery tube for the seed, a spring controlled two part reciprocating valve structure controlling passage of the seed through said tube, said parts having coacting portions for adjusting the position of the valve structure, and adjustable mechanism driven by said axle for imparting a relatively extended or reduced movement to said valve structure, substantially as described.

In testimony whereof we affix our signatures in the presence of two witnesses.

RICHARD JAMES SMITH.
DANIEL MARTIN BAKER.

Witnesses:
ARTHUR DONN PIATT,
R. H. EWING.

---

Copies of this patent may be obtained for five cents each, by addressing the "Commissioner of Patents, Washington, D. C."